United States Patent [19]
Lee et al.

[11] Patent Number: 5,213,504
[45] Date of Patent: May 25, 1993

[54] COLORING TOY

[75] Inventors: James S. W. Lee, Long Island City, N.Y.; Chen K. Nan; Chiu K. Wan, both of Taipei, Taiwan

[73] Assignee: C.J. Associates, Ltd., Hunghom Kowloon, Hong Kong

[21] Appl. No.: 708,683

[22] Filed: May 31, 1991

[51] Int. Cl.⁵ ............................................. G09B 11/10
[52] U.S. Cl. ....................................... 434/84; 434/88; 434/408; 434/412; 446/75; 446/76; 106/31 R; 106/20 A
[58] Field of Search ................... 434/84, 85, 88, 162, 434/408, 411, 412; 446/75, 76, 465; 106/31, 23; 401/17, 18, 197, 198; 206/575, 1.7, 214

[56] References Cited

U.S. PATENT DOCUMENTS

| | | | |
|---|---|---|---|
| 3,506,324 | 4/1970 | Fristedt | 206/1.7 |
| 4,306,868 | 12/1981 | Hankins | 434/85 |
| 4,600,393 | 7/1986 | Rosenwinkel et al. | 434/88 |
| 4,604,062 | 8/1986 | Woods | 434/88 |
| 4,681,471 | 7/1987 | Hayduchok et al. | 401/34 |
| 4,722,145 | 2/1988 | Prest | 106/23 X |
| 4,753,346 | 6/1988 | Tsuji | 446/75 X |
| 4,762,493 | 8/1988 | Anderson | 434/84 |
| 5,024,332 | 6/1991 | Stachler | 206/214 X |

OTHER PUBLICATIONS

Tucker Toys, "Playthings", Aug., 1982, p. 69.
S. Klein Advertising Supplement, "Washington Post", Dec. 7, 1969, p. 13.
Peg'N Doodle Desk, 1977.

*Primary Examiner*—Richard J. Apley
*Assistant Examiner*—Karen Ann Jalbert
*Attorney, Agent, or Firm*—Laff, Whitesel, Conte & Saret

[57] ABSTRACT

A liquid non-poisonous, non-metallic, edible, water soluble coloring fluid fills a felt-tipped marker. A plastic box houses the marker or a plurality of the markers. A surface on the box receives the marks from the felt-tipped marker. In one embodiment, the box is in the form of a toy vehicle. In other embodiments, there may be a plurality of stencils which can be arranged in a scene or a scroll which may be rolled to display a selected scene. Then a tracing of the scene may be made on an overlaying sheet of transparent plastic. An eraser in the form of a sponge with a plastic handle may be made wet to wash away the marks.

12 Claims, 2 Drawing Sheets

COLORING TOY

This invention relates to coloring toys and more particularly, to toys which use liquid, non-poisonous, edible pigments in a felt-tipped marker.

There are many coloring books and other devices which children may use to express their creative artistic urges. However, each of the devices has some kind of drawback. With some, the coloring device may be poisonous. Or if not poisonous, it may still make the child sick if it is ingested. Some crayons or the like may leave a waxy residue or other mess on a table or floor, which is difficult to clean-up. Some coloring devices may permanently color the child's clothes and effectively ruin them, at least for dress wear. Many of the coloring toys are a lot of work to get out and put away.

Taiwanese Patent Application Number 79109534 relates to a liquid colored, non-spreading ink. The inventors are Chen Kan Nan, Chiu Kien Wan. This application describes a water based, colored, no-smell ink which is made of nonpoisonous, metalless, edible pigment mixed with an appropriate amount of food or cosmetic type of surface active ingredients. This ink may be used to fill colored pens, especially felt-tipped markers, which can replace commonly used liquid color pens. If this kind of ink spills on cloth, it only needs to be washed with clean water and detergent to completely remove the ink stain. Spilled ink can be easily mopped off a smooth, non-absorbent surface by a damp cloth.

The ingredients of this liquid colored ink mainly comprise a metalless, nonpoisonous edible pigment supplemented by a glyceride containing a fatty acid, polybutene or polypropylene glycol type fatty acids, laurel radical sulfonate sodium type food-level surface active ingredients, or polybutene ether or ester, sorbitol fatty acids, polybutene alcohol alkyl group ether sulfonate sodium type cosmetic-level surface active ingredients which provide emulsion so as to reduce the surface spreading of the liquid, increase osmosis, and make the ink marks even, pretty, and cleanable. Finally, water is added as a diluent to make the desired color density for the liquid color ink.

The Taiwanese application describes the liquid colored ink as including:

0.5–10.0 grams edible pigment
1.0–10.0 grams emulsion or surface active ingredient, chosen from the above-mentioned food-level or cosmetic-level surface active ingredients;
0.05–0.20 gram silicone liquid bubble-reduction ingredients
5.0–40.0 gram ethyl alcohol or acetone
5.0–20.0 grams isopropyl alcohol
1.0–5.0 grams liquid wax
80.0–100.0 grams water.

The emulsion solution value for HLB (hydrophile-lipophile balance) is between 8 and 16. The bubble-reduction ingredient is preferably silicone.

The ink is made by evenly spreading or diluting edible pigment (organic pigment) in a small amount of water resulting in a liquid pigment. Then, a negative ion type, positive ion type, or non-ion type of surface active ingredient is chosen as an emulsion, adjusted in non-ion type surface active ingredients so that the HLB value is between 8 and 16. Next the above-mentioned liquid pigment is added and stirred evenly. Next bubble-reduction ingredients are added to reduce the amount of bubbles during the mixing process. Also ethyl alcohol or acetone is added to help reduce ink surface spreading at the time of use, the amount being adjustable according to the type of the above-mentioned emulsion. The ethyl alcohol or acetone also has antiseptic and disinfecting effects. The addition of isopropyl alcohol helps the solubility of the pigment while the addition of liquid wax maintains the brightness of color and reduces the volatility of the color solution.

The pH value of the pigment solution is then adjusted to be between 5 and 9, depending on the pigment and surface active ingredients, to guarantee the stability of the product. Finally, pure or distilled water is added to obtain an evenly mixed solution. The amount of added water can be adjusted to provide differing shades of colors.

The following examples are found in the Taiwanese application.

EXAMPLE 1

Take 2 grams of tartrazine yellow (number 5 edible yellow pigment), put them in 20 grams of water, add 5 grams of glyceride containing a fatty acid as an emulsion (HLB=13.5), stir even; add 0.1 gram of a silicone liquid bubble-reduction ingredient, 10 grams of ethyl alcohol, 8 grams of isopropyl alcohol, stir even; add 2 grams liquid emulsion wax, use 10% of a citric acid solution to adjust the pH value to about 5.5; finally add 70 grams of pure water, stir even. The result is liquid yellow ink.

EXAMPLE 2

Take 1 gram of erythrosine (red 30 edible pigment), put it in 20 grams of water, add 6 grams of polyvinyl alcohol ether (HLB =14.0), stir even; add 0.05 gram of a silicone liquid bubble-reduction ingredient, 20 grams of ethyl alcohol, and 10 grams of isopropyl alcohol, stir even; add 2 grams of liquid emulsion wax, use 10% of metal sodium acid to adjust the pH value to about 10; finally add 70 grams of pure water, stir even. The result is liquid pink ink.

The unique features for this ink material are defined as both permanency and erasable (or washable). When markers loaded with this ink are used on a plastic surface, not only is there no streakings or smearings, but also the ink dries almost instantly on the plastic surface, depending upon humidity. The ink remains permanently on the surface until it is wiped off by a wet cloth or tissue. In that regard, the ink is erasable. The ink can also be used to write on glass, ceramics, acetate, mylar, whiteboard, or the like.

A toy based upon this liquid colored ink is unlike other existing toys presently being offered in the marketplace. The existing water-base marker products are claimed to be erasable. However, while that might be true in the strictest sense, none of the available inks stay permanently on a plastic resin surface. Also, most of them have common shortcomings such as smearing and instability of colors, especially after they are applied to a plastic surface. None of them dry completely.

Therefore, there is a need for a coloring toy which is quick and easy to get out and put away, which has edible coloring agents, and which may be easily cleaned up.

Accordingly, an object of the invention is to provide new and novel coloring toys. Here, an object is to provide a compact "book" which not only provides a surface for receiving colored ink, but which also may provide a carrying box. In this connection, an object is to provide such a carrying box which may be colored and then used for play independent of the coloring aspects of the toy.

In keeping with an aspect of the invention, these and other objects are accomplished by providing a kit having a housing which displays a surface on which a child may draw. The housing has a hinged door so that the markers may be stored inside. The housing may also have external contours, such as a truck with freely turning wheels, for example, so that is may be an object of play in and of itself.

More specifically, the invention contemplates a series of 3-D toy vehicles that are designed in two clam shell halves which are hinged together to open and close somewhat like a book. The vehicles have freely turning wheels. For instance, the vehicle might be a truck, a school bus, or a locomotive, molded in white or a light color with a highlight detail texture to provide drawing/coloring guides. Thus, the toy vehicle is somewhat like a 3-D coloring book with an added feature that it may be opened to store a set of 3 to 6 markers, and then it may be closed and used as a carrying case.

Various embodiments accomplishing the above cited objects, are shown in the attached drawings, wherein.

Figure 1:
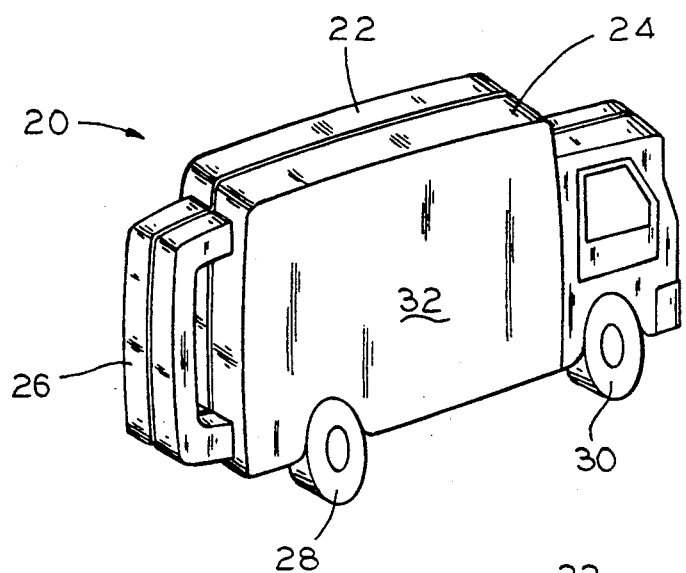
FIG. 1 is a perspective view showing a combination toy truck, marker box, and display area for receiving the marking.

The toy truck 20 (FIG. 1) is made of two molded sides 22, 24 which are hinged together in a clam shell construction. The toy truck has a handle 26 for easy carrying. The wheels 28, 30 turn easily so that the structure may be used as a toy truck.

The side 32 of the van is a relatively large area where the child may write. Depending upon his creativity, the child may simply draw a picture, write a company name, apply jungle camouflage, or the like, to the side of the truck. Of course, he may simply lay the truck on its side and use the area 32 as a slate for writing. The point is that there is great flexibility for whatever purpose or creativity the child may wish to employ.

Figure 2:
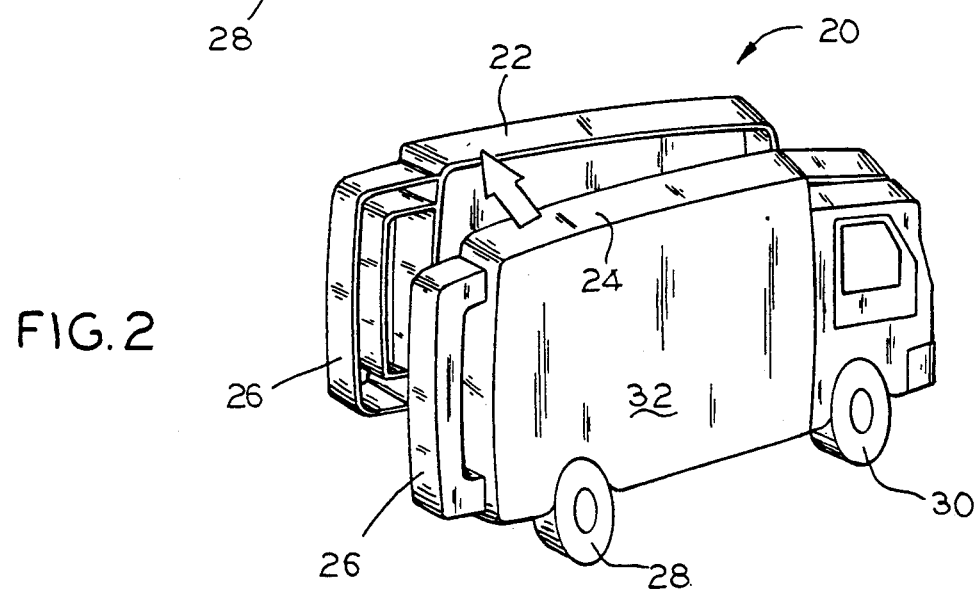
FIG. 2 is a perspective view similar to that of FIG. 1, with hinged door starting to open.
Figure 3:
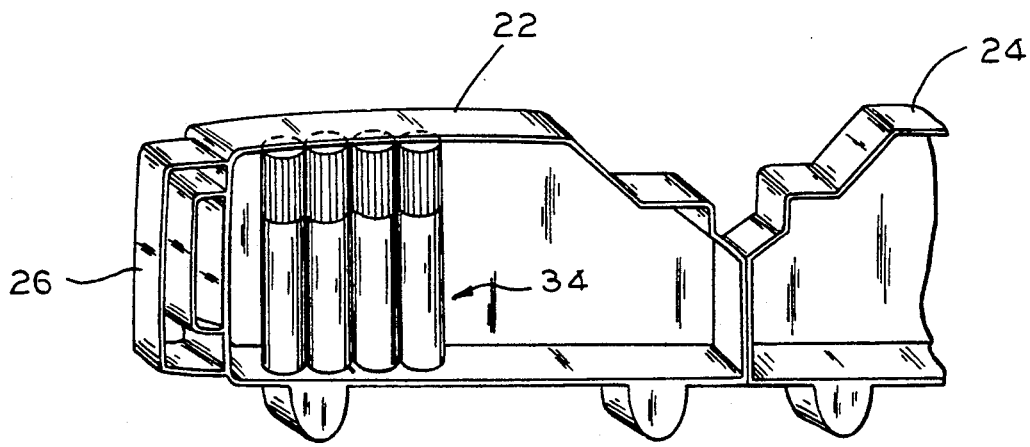
FIG. 3 shows the toy of FIGS. 1 and 2 completely open, revealing markers housed inside the truck body.

If the child wishes, he may grip the two halves (preferably at handle 26) of the truck and pull it open (FIG. 2). The two halves are hinged together at the front of the truck so that it opens and closes as a box. When the two halves are fully separated from each other (FIG. 3), it is seen that a number of felt-tipped markers 34 may be stored inside. Of course, any other suitable things may also be stored inside. For example, an eraser for cleaning off the writing or accessories for a truck or traffic device may be stored inside the box.

The toy may be in any of many possible forms and does not need to be a truck. For some children, perhaps a school bus or room or a special building may be preferable over a truck. For some organizations, there may be special appearances. For example, a church might want a building that looks like a church to give to its children.

Another activity unit (FIGS. 4-7) is a drawing box with a lift-to-open cover having a transparent plastic window, which is molded from a suitable see-through material, such as ABS or K resin. Beneath the transparent cover, there is a suitable graphic device such as one or more stencils or a scroll of preprinted drawings or other suitable design patterns for children to select and use as a tracing guide. The young artist, such as age 5 to 8, is entertained by the coloring activity of using the water base/erasable markers to create the colored artwork on the transparent plastic piece. The activity gives the child many hours of fun since he can erase the coloring with a wet sponge or other wet applicators.

Figure 4:
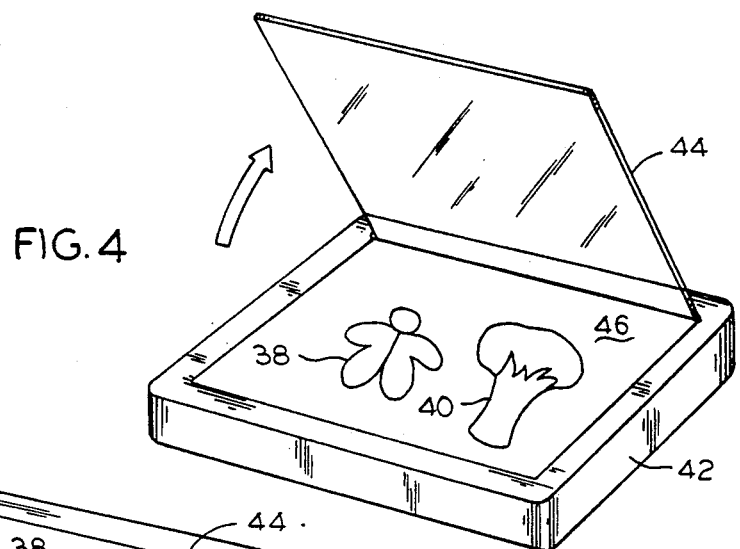
FIG. 4 is a perspective view of a second embodiment which shows a picture guide in the form of movable stencils being installed in a coloring box.
Figure 5:
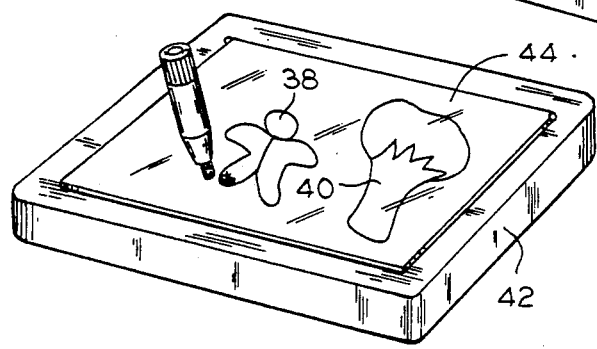
FIG. 5 shows the body of FIG. 4 closed and being used.

In the embodiment of the invention shown in FIGS. 4, 5 the child has die cut pieces 38, 40 which are a part of the toy. These die cut pieces could be generic, such as a tree, a man, a woman, a child, etc. Or the die cut pieces may be specific things such as a popular animated cartoon, a super-hero, Cinderella, or one of the fashion dolls which has developed a personality and identity of its own.

The remainder of the toy is a base unit or box 42 having a clear plastic lid 44 hinged thereto. The base may hold the markers when they are not in use. The child raises the lid 44 and arranges one or more die cut pieces 38, 40 (or a picture torn from a magazine or a comic strip, for example) under the lid 44. Then, the lid 44 is closed (FIG. 5). The child uses the markers to draw on cover 44 and over the picture under the cover. When the pieces 38, 40 are removed, only the hand drawn picture remains in front of the background provided by the plastic surface 46 of the box itself. The background of the hand drawn picture may be a simple white or similar uniform color. Or the child may draw on surface 46 to put a background of his choosing into his picture.

Figure 6:
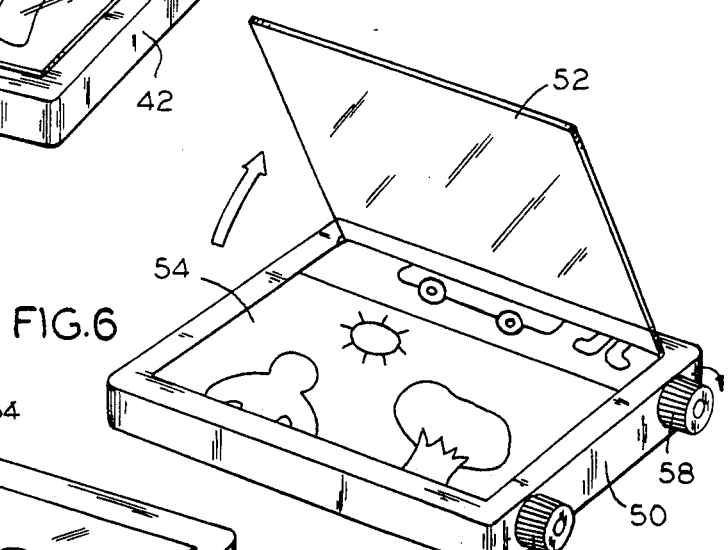
FIG. 6 is a perspective view of a third embodiment of the invention using a scroll with graphics thereon.
Figure 7:
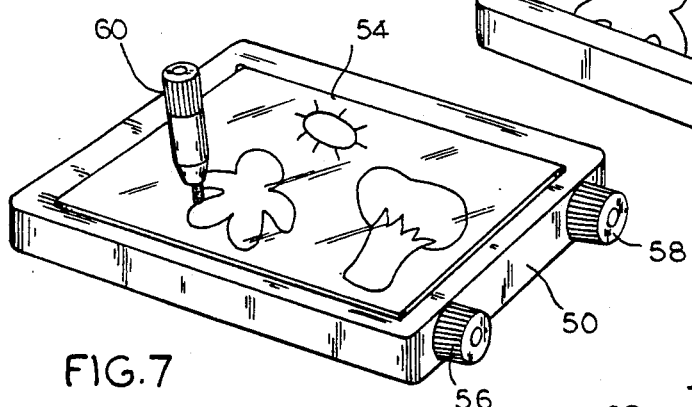
FIG. 7 shows the third embodiment of the invention in use.

A third embodiment is shown in FIGS. 6, 7. The box 50 has a clear and transparent top 52 hinged thereto. Inside the box 50, there is a scroll of paper or plastic 54 with a number of pictures thereon, with perhaps one or more blank frames of different colors to enable the child to view his work against a clear background.

Two knobs 56, 58 are on the ends of spindles (not shown) on which the roll 54 of paper or plastic is mounted, in order to form the scroll. Thus, by turning the knobs 56, 58, any of the pictures or the clear background on the scroll may be displayed under the transparent top 52. The child's job is to color (FIG. 7) the picture which is so displayed by using a felt-tipped marking pen 60 to color the upper surface of the clear plastic top.

A combination of graphics may be used where the child uses a preprinted picture to make a colored drawing and then turns the knobs 56, 58 to place a light colored, blank field in the background so that it looks like the child drew the picture on his own and with nothing to guide him.

Figure 8:
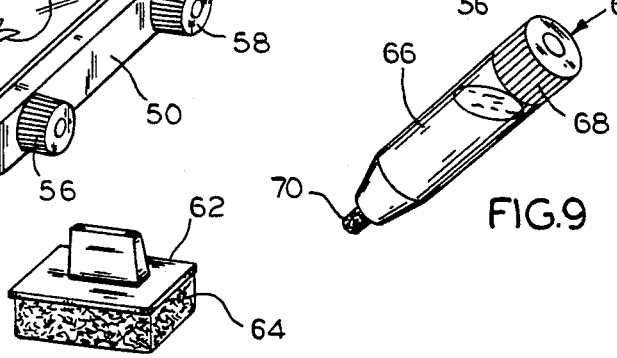
FIG. 8 is a perspective view of a wet sponge which may be used for erasing.

FIG. 8 shows an eraser for the ink. It has a plastic handle 62 with a sponge 64 attached thereto. The sponge may be made wet in order to wash away the images that the child has drawn.

Figure 9:
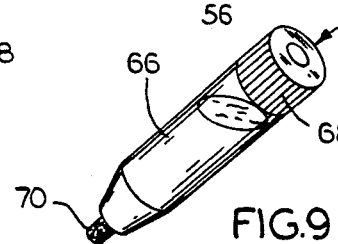
FIG. 9 shows a felt marker that is used with the invention.

The felt marker 60 (FIG. 9) may be a complete unit which is sold with the ink in a pre-packed manner. Or, it may be a plastic housing 66 having a cap 68 which may be removed so that the housing may be filled with a new supply of colored liquid taken from a bulk container. The colored liquid wets the felt-tip 70 which is used as a pen to draw the lines.

The water base inks are delivered through the media of felt-tipped markers onto plastic resin surface, particularly ABS material. Within the normal humidity range the coloring finish is dried within seconds and stabilized within minutes, but all coloring can be erased with a wet cloth, a tissue or a sponge.

Those who are skilled in the art will readily perceive how to modify the invention. Therefore, the appended claims are to be construed to cover all equivalent structures which fall within the true scope and spirit of the invention.

We claim:

1. A toy comprising a kit including at least one felt-tipped marker containing a liquid, wherein said liquid comprises a mixture of edible pigment, emulsion, bubble-reduction ingredients, ethyl alcohol or acetone, isopropyl alcohol, liquid wax and water; a box having a surface for receiving markings from said marker, said markings being cleaned off said surface by being made wet; and means for storing at least said marker inside said box.

2. The toy of claim 1 wherein said liquid further comprises:
   0.5–10.0 grams edible pigment;
   1.0–10.0 grams emulsion;
   0.05–0.20 grams silicone liquid bubble-reduction ingredients;
   5.0–40.0 grams ethyl alcohol or acetone;
   5.0–20.0 grams isopropyl alcohol;
   1.0–5.0 grams liquid wax; and
   80.0–100.0 grams water.

3. The toy of claim 2 wherein said box comprises a pair of sides hinged together at one point in a clam shell configuration, said box being in the shape and form of a vehicle having wheels, whereby said toy may optionally be used as an object of play as a vehicle, a slate or blackboard, or as a pencil box.

4. The toy of claim 3 wherein said vehicle is a truck with a body, and said surface is a part of said truck body to receive graphics setting forth information about the truck.

5. The toy of claim 2 wherein said box comprises a transparent surface overlaying an area for displaying graphics, whereby a child may trace the displayed graphics on said transparent surface.

6. The toy of claim 5 wherein said area comprises a recess and said graphics are separate pieces which may be laid in said recess, and said transparent surface is on a transparent panel hinged to raise above or to fold down over said recess.

7. The toy of claim 5 wherein said area has a strip of paper extending over it, means on each side of said area for rolling said paper to form a scroll, said graphics being printed on said paper.

8. The toy of claim 7 wherein said strip of paper includes at least one blank frame against which said marks may be viewed.

9. The toy of claim 5 wherein said area for displaying said graphics is a surface for receiving said markings after said graphics are removed, whereby a child may make a background for the markings on said transparent surface.

10. The toy of claim 1 and eraser means comprising a sponge and a plastic handle.

11. A toy comprising means for making erasable marks on a plastic surface;
   box means for storing at least one of said marking means;
   a transparent plastic surface hingedly connected to said box means for erasably receiving marks and graphics on said surface and for permitting placement of marks and graphics beneath said surface whereby a child may access both marks and graphics on said surface and beneath said surface as desired; said means for making erasable marks comprising:
   0.5–10.0 grams edible pigment;
   1.0–10.0 grams emulsion;
   0.05–0.20 grams silicone liquid bubble-reduction ingredients;
   5.0–40.0 grams ethyl alcohol or acetone;
   5.0–20.0 grams isopropyl alcohol;
   1.0–5.0 grams liquid wax; and
   80.0–100.0 grams water.

12. A toy comprising means for making erasable marks on a plastic surface;
   box means for storing at least one of said marking means;
   a transparent plastic surface hingedly connected to said box means for erasably receiving marks and graphics on said surface and for permitting placement of marks and graphics beneath said surface whereby a child may access both marks and graphics on said surface and beneath said surface as desired; a hinged pair of clam shell sides which open or close; and wheels which make said hinged clam shells a toy vehicle.

* * * * *

UNITED STATES PATENT AND TRADEMARK OFFICE
CERTIFICATE OF CORRECTION

PATENT NO. :  5,213,504

DATED      :  May 25, 1993

INVENTOR(S) :  Lee, et al

It is certified that error appears in the above-identified patent and that said Letters Patent is hereby corrected as shown below:

Col. 1, line 46, after the word "including" insert
-- the following ingredients in a ratio, by weight,
   corresponding to --;

Claim 2, Col. 5, line 31, after the word "comprises" insert
-- the following ingredients in a ratio, by weight,
   corresponding to --;

Claim 11, Col. 6, line 31, after the word "comprises" insert
-- the following ingredients in a ratio, by weight,
   corresponding to --.

Signed and Sealed this

Thirty-first Day of May, 1994

Attest:

BRUCE LEHMAN

*Attesting Officer*   *Commissioner of Patents and Trademarks*